United States Patent
Chandra et al.

(10) Patent No.: US 9,292,648 B1
(45) Date of Patent: Mar. 22, 2016

(54) ACTIVITY-DRIVEN CAPACITANCE REDUCTION TO REDUCE DYNAMIC POWER CONSUMPTION IN AN INTEGRATED CIRCUIT

(71) Applicant: Apple Inc., Cupertino, CA (US)

(72) Inventors: Amit Chandra, Milpitas, CA (US); Karthik Rajagopal, Mountain View, CA (US); Muthukumaravelu Velayoudame, Fremont, CA (US); Praveen Bhutani, Milpitas, CA (US); Sunil Mehta, Pleasanton, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/492,923

(22) Filed: Sep. 22, 2014

(51) Int. Cl.
*G06F 17/50* (2006.01)

(52) U.S. Cl.
CPC ........ *G06F 17/5077* (2013.01); *G06F 17/5009* (2013.01); *G06F 17/5081* (2013.01)

(58) Field of Classification Search
CPC ............ G06F 17/5077; G06F 17/5009; G06F 17/5081
See application file for complete search history.

(56) References Cited

U.S. PATENT DOCUMENTS

| | | | |
|---|---|---|---|
| 6,397,170 B1 | 5/2002 | Dean et al. | |
| 6,732,346 B2 | 5/2004 | Horne et al. | |
| 6,950,998 B1 * | 9/2005 | Tuan | G06F 17/5072 703/14 |
| 7,260,804 B1 * | 8/2007 | Burstein | G06F 17/5077 716/104 |
| 7,360,193 B1 * | 4/2008 | Burstein | G06F 17/5072 716/106 |
| 7,555,741 B1 | 6/2009 | Milton et al. | |
| 7,840,918 B1 * | 11/2010 | Duthou | G06F 17/5068 716/132 |
| 8,332,805 B1 | 12/2012 | Birch et al. | |
| 9,003,351 B1 * | 4/2015 | Verma | G06F 17/5045 716/126 |
| 2007/0226673 A1 * | 9/2007 | Habitz | G06F 17/5081 716/113 |
| 2007/0234266 A1 * | 10/2007 | Chen | G06F 17/5054 716/113 |
| 2013/0305203 A1 * | 11/2013 | Soni | G06F 17/5077 716/115 |
| 2015/0269302 A1 * | 9/2015 | Katta | G06F 17/5077 716/120 |

* cited by examiner

*Primary Examiner* — Nha Nguyen
(74) *Attorney, Agent, or Firm* — Meyertons, Hood, Kivlin, Kowert & Goetzel, P.C.; Lawrence J. Merkel

(57) ABSTRACT

In an embodiment, a methodology for designing an integrated circuit that attempts to improve power efficiency is provided. The methodology includes simulating the design under one or more power stimuli, where the power stimuli are known to cause high power consumption (e.g. in previous designs of the integrated circuit, the power stimuli may have caused power consumption). A set of nets within the integrated circuit may be identified that have the highest activity in the simulation (e.g. the highest amount of switching). The methodology may include providing data to the routing tool that is to route the nets in the integrated circuit. The data may indicate constraints for the set of nets, to help reduce dynamic power on these nets. Power efficiency of the integrated circuit may be improved if the routing tool is able to honor the constraints.

18 Claims, 4 Drawing Sheets

Cells A and B Logically Equivalent
$C_A > C_B$

ACTIVITY-DRIVEN CAPACITANCE REDUCTION TO REDUCE DYNAMIC POWER CONSUMPTION IN AN INTEGRATED CIRCUIT

BACKGROUND

1. Technical Field

Embodiments described herein are related to designing an integrated circuit and managing power consumption in the design.

2. Description of the Related Art

The methodology for digital integrated circuit design has historically been timing-driven. The methodology generally includes the process of coding the logic that implements the desired operation for the circuit, synthesizing the coded logic into circuitry specified in a library of predefined circuits (called cells), physically arranging instances of the cells with respect to each other for fabrication on the integrated circuit (referred to as placing the cells), and connecting the cells with wiring by specifying the wiring layers for the integrated circuit (referred to as routing). The methodology may generally focus on optimizing the timing of the integrated circuit, so that the integrated circuit will operate at a specified clock frequency when fabricated.

More recently, optimization of power consumption has become an important factor in integrated circuit design. Integrated circuits are frequently being included in a variety of mobile devices, which are often operating on a limited power source such as a battery. Battery life is figure of merit for such devices, and thus integrated circuits which efficiently use power to perform their operations are desirable. Additionally, efficient devices may be more easily cooled and otherwise thermally managed in a system, even if battery life is not a concern (e.g. in a desktop computer that is plugged into an electrical outlet or other essentially unlimited power source).

Typically, efforts to improve power efficiency have been focused on designing efficient cell libraries, providing microarchitectural features such as clock gating, power gating, and multiple power states that provide different performance/power tradeoffs, etc. The methodology remains timing-driven.

SUMMARY

In an embodiment, a methodology for designing an integrated circuit that attempts to improve power efficiency is provided. The methodology includes simulating the design under one or more power stimuli, where the power stimuli are known to cause high power consumption (e.g. in previous designs of the integrated circuit, the power stimuli may have caused high power consumption). A set of nets within the integrated circuit may be identified that have the highest activity in the simulation (e.g. the highest amount of switching). The methodology may include providing data to the routing tool that is used to route the nets in the integrated circuit. The data may indicate constraints for the set of nets, to help reduce dynamic power on these nets. Power efficiency of the integrated circuit may be improved if the routing tool is able to honor the constraints.

BRIEF DESCRIPTION OF THE DRAWINGS

The following detailed description makes reference to the accompanying drawings, which are now briefly described.

Figure 1:
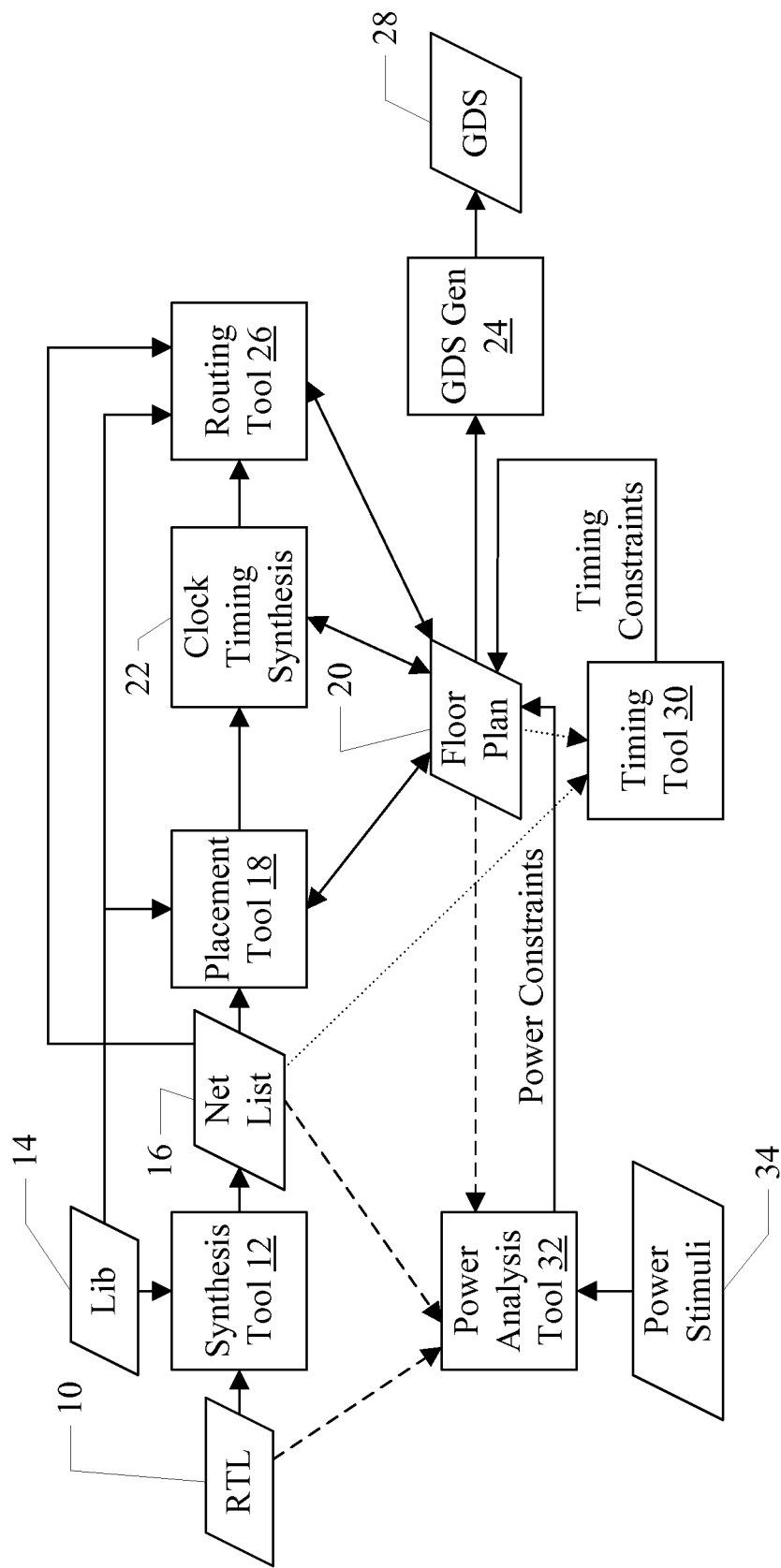
FIG. 1 is a block diagram illustrating one embodiment of a methodology for designing an integrated circuit.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112(f) interpretation for that unit/circuit/component.

This specification includes references to "one embodiment" or "an embodiment." The appearances of the phrases "in one embodiment" or "in an embodiment" do not necessarily refer to the same embodiment, although embodiments that include any combination of the features are generally contemplated, unless expressly disclaimed herein. Particular features, structures, or characteristics may be combined in any suitable manner consistent with this disclosure.

DETAILED DESCRIPTION OF EMBODIMENTS

Turning now to FIG. 1, a block diagram illustrating one embodiment of a methodology for designing an integrated circuit is shown. The methodology begins with a register transfer level (RTL) description of the logic of the integrated circuit (reference numeral 10). The RTL description 10 is input to a synthesis tool 12, which also has access to a library 14 of predesigned circuit "cells." The RTL description 10 may be expressed in any hardware description language (HDL) such as Verilog, Very High Speed Integrated Circuit Hardware Description Language (VHDL), etc. The RTL description 10 may be a behavioral level description if the synthesis tool 12 is a behavioral synthesis tool. The output of the synthesis tool 12 may be a net list 16, which may be a list of instances of the cells from the library 14 and the connection between the cell instances that realizes the RTL description 10. The connection may be expressed using the same signal name between a given output pin of a cell and the input pin(s) of other cells to which the output pin is connected. The net list 16 may further include instances of a custom circuit design created by the designer and not included in the library 14 for general use. The custom circuits may be directly instantiated in the RTL 10 and may not be changed by the synthesis tool 12. Additionally, a floor plan 20 may be developed with a floor plan tool (not shown). The floor plan 20 may be developed, e.g., based on the blocks into which the integrated circuit is divided and their expected areas and/or geometric shape on the integrated circuit.

The net list 16 and the floor plan 20 may be input to a placement tool 18, which may determine a physical arrangement of the cells/circuits on the surface of a semiconductor substrate which will form the integrated circuit when manufactured. The placement tool 18 may receive description from the library 14 of the size of each cell (x and y directions) and the location of input and output pins on each cell. The placement tool 18 may take into account which pins of each cell instance are coupled to which pins of other cell instances in making the placement, as well as the overall dimensions of the integrated circuit (or the block within the integrated circuit, if the RTL description 10 is for less than the entire integrated circuit). The placement tool 18 may update the floor plan 20 to reflect the placement of the cells. The updated floor plan 20 may be input to the clock timing synthesis tool 22. The clock timing synthesis tool may synthesize the clock circuits for the integrated circuit and may insert them into the floor plan 20.

The floor plan 20 as updated by the clock timing synthesis tool 22 may be input to the routing tool 26 (or more simply "router" 26). The router 26 may generate descriptions of the metal layers for the integrated circuit, connecting output pins to input pins as specified by the net list 16. The output of the routing tool 26 may further update the floor plan 20. Once the design is complete, the updated floor plan 20 may be provided to a graphic data system (GDS) generator 24, which may generate the GDS description 28 of the integrated circuit. The GDS description 28 may be transmitted to the foundry that manufactures the integrated circuit. The information in the GDS description 28 may be used for mask fabrication and other processing at the foundry to produce the integrated circuit.

The router 26 may generally determine the routing for each net specified in the net list 16. A net may be one conductor on which a signal output by a cell/circuit is communicated to one or more input pins of one or more other cells/circuits. The net may include multiple end points (one output and multiple inputs, or even multiple output pins if the cells are controlled to avoid contention). The net may also include conductors at more than one metal layer in the integrated circuit, as well as vias between the layers, etc. The conductors may also be referred to as wires.

The router 26 may be primarily constrained by the congestion of other nets in the integrated circuit, the number of metal layers being implemented, other physical concerns, and timing criticality. A net may be timing-critical if it is part of a logic path (instances of cells/circuits and their nets) that is among the longest in the design (and thus may be limiters in terms of the clock frequency at which the integrated circuit may operate). A timing tool 30 may perform timing analysis on the various design descriptions to identify timing critical nets. For example, the timing tool 30 may receive the net list 16 and may analyze the net list to determine critical paths. The timing tool 30 may use information from the floor plans 20 and 24 to estimate the resistance and capacitance (RC) delays in the design to more accurately analyze the timing. The timing tool 30 may provide the timing constraints to the router 26 (and/or may annotate the floor plan 24 or other input data to the router 26 with the timing constraints). The timing tool 30 may provide the constraints in any desired fashion (e.g. a list of timing-critical nets, a ranking, a maximum length for the nets, or other constraints).

A power analysis tool 32 may be provided to perform power analysis on the integrated circuit, using one or more power stimuli 34. The power stimuli 34 may be stimulus to the integrated circuit that is known to cause high power consumption, as mentioned previously. The analysis may be performed using any of the descriptions of the integrated circuit in RTL 10, net list 16, or floor plan 20 (or combinations of information from the descriptions, as desired). Generally, the power analysis tool 32 may simulate the integrated circuit design under the power stimuli 34 and may determine which nets are the most actively switching in the design. The power analysis tool 32 may output various power constraints to the router 26 (e.g. by annotating the input data to the router 26). Various examples of constraints are discussed in more detail below. The power analysis may be performed at any point in the process of updating the floor plan 20 after the net list 16 is generated. The power analysis may be performed multiple times as the design of the integrated circuit is refined.

If there is conflict between the power constraints and the timing constraints, the timing constraints may be given higher weight. In one embodiment, for example, if the timing constraints are applied to a given net, the power constraints for that given net may be dropped. In some cases, the constraints that favor better timing characteristics may be opposite of those that favor power efficiency. Since timing needs to be met for the integrated circuit, the timing constraints may be permitted to dominate the power constraints in conflicting situations.

Generally, a constraint may be a restriction that would be desirable to maintain on the corresponding net in the routing process. The constraint may not be a demand (e.g. the router 26 may be able to violate the constraint), but rather may be a guide to the selection of routes and wire properties for a given net.

A variety of constraints may lead to better power efficiency for a net, and thus may be used as power constraints. Generally, the examples below may reduce capacitance on the net, which may reduce dynamic power consumption since power consumption is proportional to the capacitance. Other examples that reduce capacitance or other impedance are contemplated, as well as examples that reduce power consumption in other ways.

At each metal layer, the wires may run in parallel in one direction, and the direction is orthogonal between two adjacent metal layers. Accordingly, a wire may be connected from one point to another by travelling in one direction at one metal layer and connecting to another metal layer travelling in the orthogonal direction, repeated as many times as desired to get from one point to another.

Figure 2:
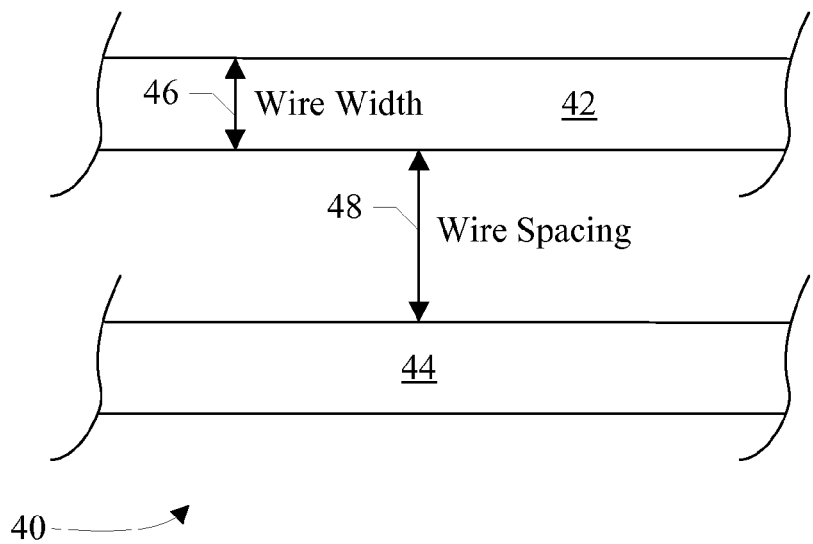
FIG. 2 is a block diagram of a top view of a portion of a metal layer.

At each layer, the parallel wires may each have a wire width and there may be a wire spacing between the wires. For example, FIG. 2 is a block diagram of one embodiment of a top view of a metal layer 40. The metal layer 40 includes two parallel wires 42 and 44. The wire 42 has a wire width 46, and the wires have a wire spacing 48 between them. At each wiring layer, the semiconductor fabrication process specifies a minimum wire width and a minimum spacing. Generally, as the layers increase (farther from the surface of the semiconductor substrate), the minimums may increase although multiple adjacent layers may have the same minimums.

Increased wire widths may result in increased capacitance (since the wider wire has more surface area to serve as a "plate" of the capacitor). On the other hand, increased wire widths reduce resistance in the wire, which is a benefit for timing. Accordingly, the router 26 may have a tendency to use non-minimum width wires for more timing-critical paths. A power constraint may be a constraint on the wire width for high activity nets. The constraint may be to use the minimum wire width, or to limit the wire width to no more than a maximum. The limit may be expressed as a factor of the minimum size or as a measurement (e.g. in microns).

Similarly, decreased wire spacing may permit more wires per unit of area, so the router 26 may have a tendency to use minimum spacing between wires. However, minimum spacing may cause the highest amount of cross coupling capacitance between the wires. A power constraint may be to use non-minimum spacing for high activity nets, or to ensure that spacing is at least an amount specified by the constraint. The amount may be expressed as a factor of the minimum spacing or as a measurement (in microns).

Figure 3:
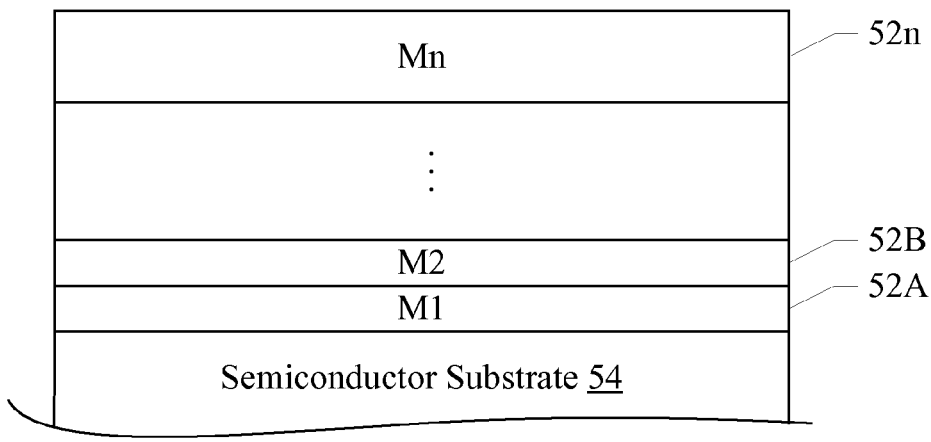
FIG. 3 is a block diagram of one embodiment of a side view of multiple metal layers on a semiconductor substrate.

FIG. 3 is a block diagram of a simplified side view of one embodiment of an integrated circuit 50 including metal layers 52A-52n and a semiconductor substrate 54. Not shown in FIG. 3 are insulating layers that may be included between the wiring layers. The layers 52A-52n are labeled M1 to Mn, and there may be any number of layers in various embodiments. M1 layer 52A may be the layer nearest to the substrate 54, and other layers are increasingly distant from the semiconductor substrate 54 until the top layer (Mn layer 52n) is reached. Generally, the thickness of the metal layers increases as the layers get farther from the surface of the semiconductor substrate (where thickness is measured in the vertical direction as seen in FIG. 3, as compared to the width measured in the horizontal direction across the wiring plane, e.g. as shown in FIG. 2). Thus, for example the Mn layer 52n is shown as thicker than the M1 and M2 metal layers 52A-52B.

Thicker wires, like wider wires, may have a higher capacitance and lower resistance. Accordingly, higher metal layers may be favored by the router 26 for timing critical nets. A power constraint may be a restriction to the lower metal layers. For example, the constraint may specify the highest metal layer that should be used for an active net and the router 26 may attempt to route the active nets in the layers at or below the specified highest metal layer.

Figure 4:
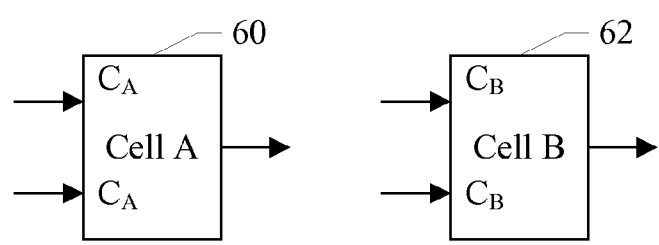
FIG. 4 is a block diagram of one embodiment of cells.

Another source of capacitance on a net may be the pin capacitance on the input pins of the cells to which the net is connected. There may be several versions of each cell in the library, some of which have higher input pin capacitance than others. Often, the cells which have higher input pin capacitance are the faster cells, and thus may be used on timing-critical paths. However, if a net is identified as highly active in the power simulations but is not a timing critical net, a substitution of one cell for a (logically equivalent) cell with a lower pin capacitance may be made. For example, FIG. 4 is a diagram of two logically equivalent cells (cell A 60 and cell B 62). Cell A has input pins with input pin capacitance $C_A$, and Cell B has input pins with input pin capacitance $C_B$. $C_B$ is less than $C_A$ in this embodiment. Thus, if an instance of cell A 60 has an input pin coupled to an active net, an instance of cell B 62 may be substituted for the instance of cell A 60. Thus, a constraint may be to lower input pin capacitance on the high activity nets.

Figure 5:
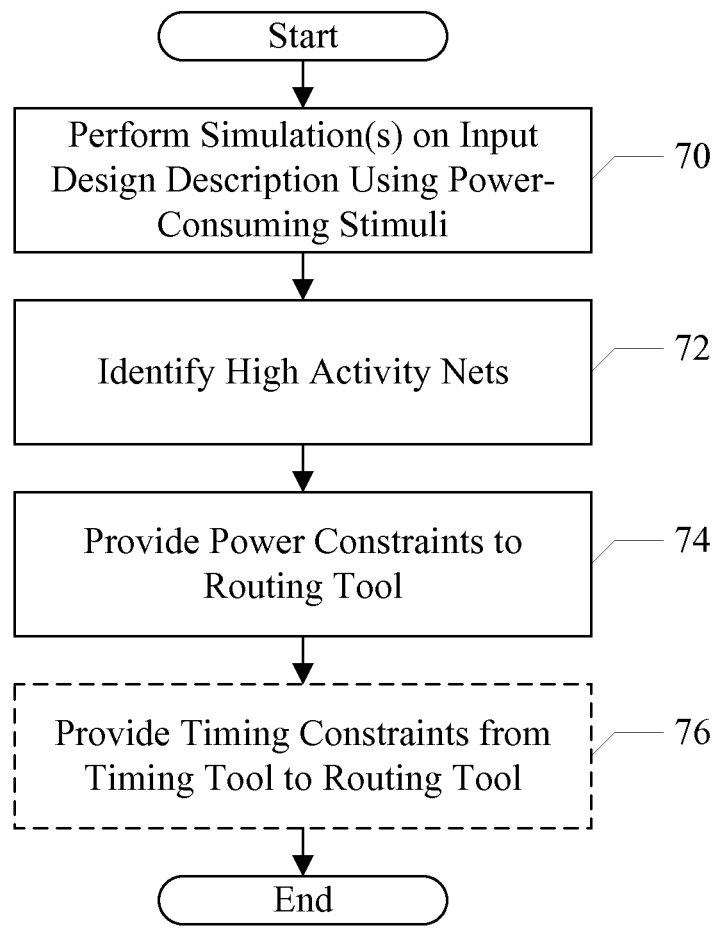
FIG. 5 is a flowchart illustrating one embodiment of a power analysis tool.

FIG. 5 is a flowchart illustrating operation of one embodiment of the power analysis tool 32. While the blocks are shown in a particular order, other orders may be used. Blocks may be performed in parallel. The power analysis tool may include instructions which, when executed on a computer, implement the operation illustrated in FIG. 5.

The power analysis tool 32 may perform one or more power simulations on the input design description using the power stimulus/stimuli 34 (block 70). The design description may be at any level in various embodiments (e.g. the RTL 10, the net list 16, the floor plan 20, etc.). Any type of simulation may be performed. For example, the simulation may be an event-driven simulation or a cycle simulation, similar to those used to verify functional correctness of the design. Circuit simulation may be used (e.g. Simulation Program with Integrated Circuit Emphasis (SPICE)-like simulation). Power-based simulation may be used. More than one simulation may be performed as the design is refined at any level, or as the design progresses through the methodology shown in FIG. 1. Responsive to the simulation, the power analysis tool 32 may identify the high activity nets (block 72). The power analysis tool 32 may identify the nets during simulation, or may process the simulation results after the simulations are complete.

High activity nets may be measured in any desired fashion, but may generally be the nets that exhibit the highest amount of switching during the power simulations. For example, a threshold level of switching activity may be selected and the nets having activity that meets or exceeds the threshold level may be identified. The highest switching M nets (where M is an integer or a percentage of the total nets in the design) may be identified as the high activity nets. Combinations of measurements may be used to identify the high activity nets.

The power analysis tool 32 may provide power constraints for use by the router 26 (block 74). For example, the power analysis tool may annotate the high activity nets in the floor plan 20 with the timing constraints. Alternatively, a different data structure may be provided with the annotations. Additionally, a timing tool may provide timing constraints for use by the router 26 (block 76). This block may be implemented by the timing tool, and thus is illustrated in dotted form in FIG. 5.

Figure 6:
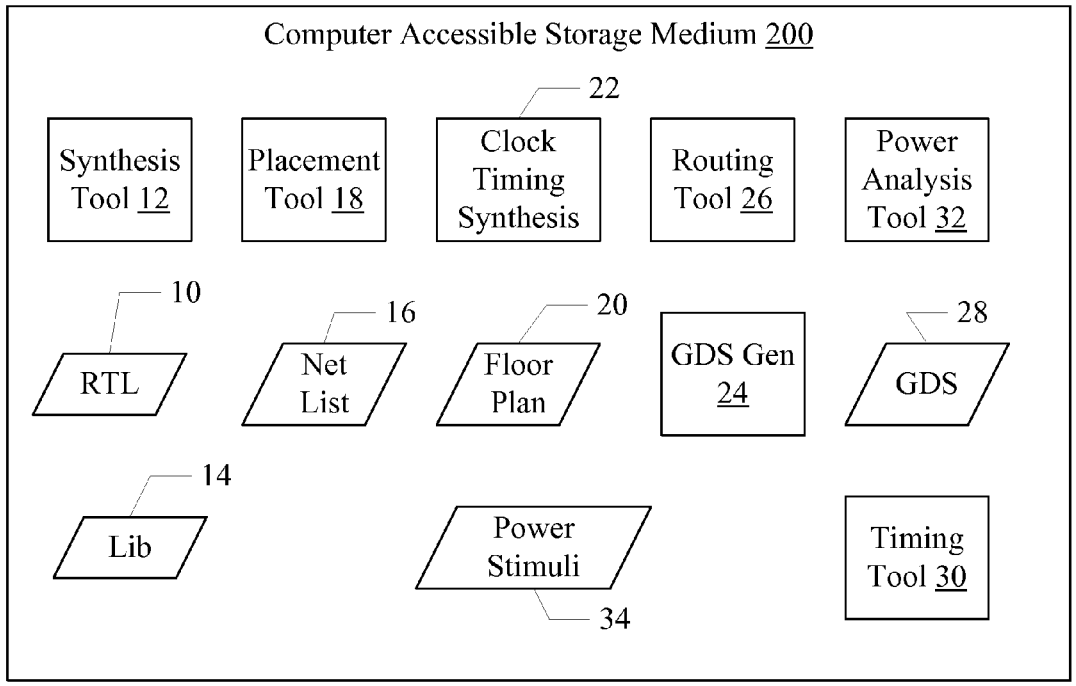
FIG. 6 is a block diagram of one embodiment of a computer accessible storage medium.

FIG. 6 is a block diagram of one embodiment of a computer accessible storage medium 200. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 200 may store data in a non-transitory manner, where non-transitory in this context may refer to not transmitting the instructions/data on a signal. For example, non-transitory storage may be volatile (and may lose the stored instructions/data in response to a power down) or non-volatile.

The computer accessible storage medium 200 in FIG. 6 may store code forming one or more of the synthesis tool 12, the placement tool 18, the clock timing synthesis tool 22, the routing tool 26, the GDS generator 24, the power analysis tool 32, and/or the timing tool 30. The computer accessible storage medium 200 may still further store one or more of the RTL 10, the net list 16, the floor plan 20, the GDS 28, the library 14, and/or the power stimuli 24. The synthesis tool 12, the placement tool 18, the clock timing synthesis tool 22, the routing tool 26, the power analysis tool 32, and/or the timing tool 30 may each include instructions which, when executed, implement the operation described for the respective tool above. For example, the method illustrated in FIG. 5 may be embodied in one or more of the power analysis tool 32 and the timing tool 30 and may be executed by one or more processors of a computer system such as the system shown in FIG. 7. Performing the method described herein may improve the power characteristics of the resulting integrated circuit, which may lead to improved battery life and other benefits in devices that incorporate the integrated circuit, in some embodiments. A carrier medium may include computer accessible storage media as well as transmission media such as wired or wireless transmission.

Figure 7:
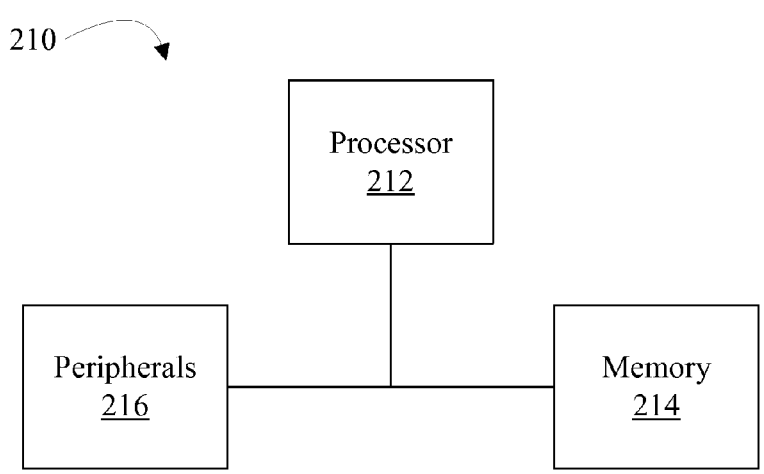
FIG. 7 is a block diagram of one embodiment of a computer system.

FIG. 7 is a block diagram of one embodiment of an exemplary computer system 210. In the embodiment of FIG. 7, the computer system 210 includes a processor 212, a memory 214, and various peripheral devices 216. The processor 212 is coupled to the memory 214 and the peripheral devices 216.

The processor 212 is configured to execute instructions, including the instructions in the software described herein such as the tools 12, 18, 22, 26, 30, and 32. In various embodiments, the processor 212 may implement any desired instruction set (e.g. Intel Architecture-32 (IA-32, also known as x86), IA-32 with 64 bit extensions, x86-64, PowerPC, Sparc, MIPS, ARM, IA-64, etc.). In some embodiments, the computer system 210 may include more than one processor.

The processor 212 may be coupled to the memory 214 and the peripheral devices 216 in any desired fashion. For example, in some embodiments, the processor 212 may be coupled to the memory 214 and/or the peripheral devices 216 via various interconnect. Alternatively or in addition, one or more bridge chips may be used to coupled the processor 212, the memory 214, and the peripheral devices 216.

The memory 214 may comprise any type of memory system. For example, the memory 214 may comprise DRAM, and more particularly double data rate (DDR) SDRAM, RDRAM, etc. A memory controller may be included to interface to the memory 214, and/or the processor 212 may include a memory controller. The memory 214 may store the instructions to be executed by the processor 212 during use, data to be operated upon by the processor 212 during use, etc.

Peripheral devices 216 may represent any sort of hardware devices that may be included in the computer system 210 or coupled thereto (e.g. storage devices, optionally including a computer accessible storage medium 200, other input/output (I/O) devices such as video hardware, audio hardware, user interface devices, networking hardware, etc.).

Numerous variations and modifications will become apparent to those skilled in the art once the above disclosure is fully appreciated. It is intended that the following claims be interpreted to embrace all such variations and modifications.

What is claimed is:

1. A method comprising:
    simulating, on a computer, a design for an integrated circuit, wherein the simulating is performed with at least one input stimulus;
    responsive to the simulating, identifying a plurality of conductors in the integrated circuit that have a highest amount of switching activity in response to the input stimulus;
    providing one or more constraints for the plurality of conductors to a routing tool that generates descriptions of metal layers for the integrated circuit, wherein the metal layers implement interconnects of the integrated circuit including the plurality of conductors, wherein the routing tool is configured to route the plurality of conductors responsive to the constraints, and wherein the constraints comprise a restriction that routing the plurality of conductors is to occur in one or more of the metal layers nearest a surface of a semiconductor substrate on which the integrated circuit is formed, excluding one or more metal layers that are farthest from the surface; and
    providing one or more timing-derived constraints to the routing tool, wherein the routing tool is configured to favor the one or more timing-derived constraints over the one or more constraints in routing the plurality of conductors.

2. The method as recited in claim 1 wherein the constraints comprise a wire width limit.

3. The method as recited in claim 1 wherein the constraints comprise a wire spacing specification.

4. The method as recited in claim 1 wherein the constraints comprise a reduction in input pin capacitance on one or more cells to which a given conductor of the plurality of conductors is coupled.

5. The method as recited in claim 1 wherein the constraints cause reduced capacitance on the plurality of conductors compared to unconstrained routing.

6. The method as recited in claim 1 wherein the at least one input stimulus causes high power consumption in the integrated circuit.

7. The method as recited in claim 1 wherein the providing comprises annotating an input data structure to the routing tool, wherein the input data structure includes description of the plurality of conductors, and wherein the annotating associates the constraints with the plurality of conductors.

8. The method as recited in claim 7 wherein the data structure further includes the one or more timing-derived constraints.

9. A non-transitory computer accessible storage medium storing a plurality of instructions which, when executed by a computer:
    invoke a simulation of an integrated circuit, wherein the simulating is performed with at least one input stimulus;
    responsive to the simulation, identify a plurality of nets in the integrated circuit that have a highest amount of switching activity in response to the input stimulus; and
    provide one or more constraints for the plurality of nets to a routing tool that generates descriptions of metal layers for the integrated circuit that implement the nets of the integrated circuit, wherein the nets include the plurality of nets that have the highest amount of switching activity, wherein the routing tool is configured to route the plurality of nets responsive to the constraints, wherein the constraints comprise a reduction in input pin capacitance on one or more cells to which a given net of the plurality of nets is coupled by selecting a different, but logically equivalent, cell from a cell library, wherein the different cell has a lower input pin capacitance.

10. The non-transitory computer accessible storage medium as recited in claim 9 further storing the routing tool.

11. The non-transitory computer accessible storage medium as recited in claim 10 further storing an input data structure to the routing tool, wherein the input data structure includes description of the plurality of nets, and wherein providing the constraints includes annotating the input data structure to the routing tool and associating the constraints with the plurality of nets.

12. The non-transitory computer accessible storage medium as recited in claim 11 wherein the data structure further includes timing-derived constraints, and wherein the routing tool is configured to favor timing-derived constraints over the constraints provided for the plurality of nets.

13. The non-transitory computer accessible storage medium as recited in claim 9 wherein the constraints cause reduced capacitance on the plurality of nets compared to unconstrained routing.

14. The non-transitory computer accessible storage medium as recited in claim 13 wherein the constraints comprise a wire width limit.

15. The non-transitory computer accessible storage medium as recited in claim 14 wherein the constraints comprise a wire spacing specification.

16. The non-transitory computer accessible storage medium as recited in claim 15 wherein the constraints comprise a restriction to one or more of the metal layers nearest a surface of a semiconductor substrate on which the integrated circuit is formed.

17. The non-transitory computer accessible storage medium as recited in claim 9 wherein the input stimulus causes high power consumption in the integrated circuit.

18. A method comprising:
   simulating an integrated circuit on a computer responsive to a first description of the integrated circuit, wherein the simulating is performed with at least one input stimulus that causes high power consumption in the integrated circuit;
   responsive to the simulating, identifying a plurality of nets interconnecting circuitry in the integrated circuit, wherein the plurality of nets that have a highest amount of switching activity of the nets in the integrated circuit in response to the input stimulus; and
   annotating a second description of the integrated circuit that is input to a routing tool that generates descriptions of metal layers for the integrated circuit, wherein the metal layers of the integrated circuit implement the interconnect of the integrated circuit including the plurality of nets, wherein the routing tool is configured to route the plurality of nets responsive to the constraints, wherein the constraints comprise a reduction in input pin capacitance on one or more cells to which a given net of the plurality of nets is coupled by selecting a different, but logically equivalent, cell from a cell library, wherein the different cell has a lower input pin capacitance.

* * * * *